United States Patent [19]
Ernest

[11] Patent Number: 6,062,287
[45] Date of Patent: May 16, 2000

[54] APPARATUS FOR DISPENSING PEEL AND STICK PRODUCT FROM A COMMON CARRIER SHEET

[75] Inventor: Frederick R. Ernest, St. Louisville, Ohio

[73] Assignee: Owens Corning Fiberglas Technology, Inc., Summit, Ill.

[21] Appl. No.: 08/869,347

[22] Filed: Jun. 5, 1997

Related U.S. Application Data

[63] Continuation-in-part of application No. 08/741,848, Oct. 31, 1996.

[51] Int. Cl.[7] .................................................. B32B 31/00
[52] U.S. Cl. ........................................ 156/542; 156/366
[58] Field of Search .................................. 156/366, 367, 156/350, 541, 542

[56] References Cited

U.S. PATENT DOCUMENTS

| | | | |
|---|---|---|---|
| Re. 30,419 | 10/1980 | Crankshaw et al. | 156/249 |
| 3,405,021 | 10/1968 | Marano | 156/361 |
| 3,436,294 | 4/1969 | Marano | 156/351 |
| 3,483,059 | 12/1969 | Dinter | 156/364 |
| 3,954,543 | 5/1976 | Messner | 223/88 |
| 4,255,220 | 3/1981 | Kucheck et al. | 156/285 |
| 5,106,447 | 4/1992 | Rado et al. | 156/334 |
| 5,472,541 | 12/1995 | Simmons et al. | 156/231 |

FOREIGN PATENT DOCUMENTS 0725117  7/1996  European Pat. Off. .

*Primary Examiner*—Francis J. Lorin
*Attorney, Agent, or Firm*—Inger H. Eckert; Stephen W. Barns

[57] ABSTRACT

A system for applying preshaped self-stick products to selected substrates includes a roll of preshaped self-stick products on a common carrier, a conveyor line for advancing a plurality of substrates, a dispenser including a remover for selectively removing the preshaped self-stick products from the common carrier and dispensing the preshaped self-stick products onto the substrates, a controller for controlling an advancing speed of the conveyor line and for indexing the dispenser, and a pressure roller for applying pressure to the self-stick products, thereby fully bonding the self-stick products to the substrates.

19 Claims, 7 Drawing Sheets

APPARATUS FOR DISPENSING PEEL AND STICK PRODUCT FROM A COMMON CARRIER SHEET

CROSS-REFERENCE TO RELATED APPLICATION

The present application is a continuation-in-part of U.S. patent application Ser. No. 08/741,848, filed Oct. 31, 1996, the entire contents of which are hereby incorporated by reference.

TECHNICAL FIELD AND INDUSTRIAL APPLICABILITY OF THE INVENTION

The present invention relates to an apparatus for the automatic dispensing of self-stick porous products from a common carrier, and applying the self-stick porous products to selected substrates.

BACKGROUND OF THE INVENTION

Fiberglass panels coated with a reactivatable adhesive are used for a variety of applications. For instance, insulation panels of fiberglass batting for heating, ventilating and air conditioning (HVAC) units are known to be bonded to metal housings by a spray application of a hot melt adhesive composition. The adhesive is sprayed onto either the metal housing or the fiberglass insulation, as disclosed in U.S. Pat. No. 5,106,447 of Di Rado et al., such that the two components can then be brought together and adhered one to the other. The fiberglass insulation is to protect against weather, reduce sound, stop water vapor from forming on the metal, and separate hot compression units from cold freon gas coils.

Continuous batts of semi-rigid porous materials, such as a foam, cellulose, and/or fibrous materials coated with a thermoplastic adhesive which can be reactivated, are commonly used in automotive trim panels. The trim panels can be made by using an adhesive coated panel and a shell or substrate and laminating a decorative cover on the adhesive coated side of the panel. These adhesive coated panels can also be used for the manufacture of other automotive products such as floor pads, hood liners, trunk liners, seating, and door panels, such as adhesive coated side of the panel. These adhesive coated panels can also be used for the manufacture of other automotive products such as floor pads, hood liners, trunk liners, seating, and door panels, such as disclosed in U.S. Pat. No. 5,472,541 to Simmons et al. In the process disclosed in the Simmons et al. patent, a powder thermoplastic adhesive is placed on a release coating on a conveyor and heated to a plasticized state. Porous material is then added and the adhesive is reheated to a melted state such that the adhesive bridges, rather than penetrates, the pores of the porous material.

In addition to conventional spray methods, materials can be coated with adhesive by heating the adhesive to a sinter temperature and then transferring the heated adhesive onto the surface of a printing roll. As the flexible material passes between the printing roll and a contact pressure roll, the adhesive is released onto the surface of the material that is in contact with the printing roll. Alternatively, powdered adhesive is sprinkled onto the material and heated with a radiant heat source to a temperature sufficient to melt the adhesive and allow the same to adhere to the underlying material.

These processes are inadequate for a number of reasons. For instance, prior processes apply adhesive to an entire surface of a fibrous material of uniform width. The adhesive generally adheres only to the surface fiber and surface dust, resulting in a weak interfacial bond between the fibrous material product, e.g. fiberglass product, and the adhesive. Further, the fibrous material is generally cut to shape after the adhesive is applied. This means that the cutting of uniquely shaped products requires the cutting mechanism to cut through the adhesive, thus leading to potential clogging of the cutting machine and other machinery. This also leads to substantial waste of the fibrous material and adhesive located outside the boundaries of the desired shape. Also, since the common carrier becomes scrap material after the product is removed, the customer, such as the HVAC manufacturer, bears the cost and environmental impact associated with the disposal of the waste material. Furthermore, much if not all of this material could be easily recycled if not for the presence of the adhesive and the burden of shipping the material back to the fibrous material fabricating facility.

The conventional processes of applying adhesive to porous mats typically do not include the ability to exclude areas of the mats from application of the adhesive. Such non-adhesive coated areas are sometimes desired for flanges that are not intended to be adhered to a surface and edge portions which otherwise would include exposed glue edges to which dirt and debris collects. Also, spraying adhesives usually involves airborne solvents or other secondary products which are not environmentally desirable.

Another system uses a vacuum and ramp conveyors designed to compress and draw hot melt adhesive into fiberglass products to increase the bonding strength, as disclosed in EP 725 117 published Aug. 7, 1996. While this vacuum system is advantageous over other systems, it is like such other systems in that it still requires manual manipulation of the adhesive-coated porous mat or fiberglass product in order to apply it in the workplace. In the case of fiberglass insulation panels, this requires the user to handle the adhesive-coated insulation panel and then manually position the panel onto the particular substrate. Not only may the contact of the fiberglass insulation on the user's skin cause minor irritation, but the manual positioning of each panel onto the substrate does not provide the user with the desired high consistency of product.

SUMMARY OF THE INVENTION

The present invention mitigates or eliminates the last above-mentioned drawback by providing a system for applying preshaped self-stick products to selected substrates, which system includes a roll of preshaped self-stick products on a common carrier, a conveyor line for advancing a plurality of substrates, a dispenser including a remover for selectively removing the preshaped self-stick products from the common carrier and dispensing the preshaped self-stick products onto the substrates, a controller for controlling an advancing speed of the conveyor line and for indexing the dispenser, and a pressure roller for applying pressure to the self-stick products, thereby fully bonding the self-stick products to the substrates.

BRIEF DESCRIPTION OF THE DRAWINGS

The present invention will be now described by way of exemplary embodiments with reference to the accompanying drawing figures, in which.

DETAILED DESCRIPTION AND PREFERRED EMBODIMENTS OF THE INVENTION

As used herein, the term "porous mat" means a material which is resiliently compressible to a degree such that after compression the material returns to a substantially identical size and shape and has a surface porosity large enough to permit adhesive to enter the material in a compressed state. Examples of such a porous material include polyester fiber, polypropylene fiber, fiberglass or any other mineral fiber to which a binder is added which holds the individual fibers together where they cross one another to form a cohesive wool. Such mineral fiber mats include flexible glass wool mats having a density from about 15 kg/m$^3$ to 80 kg/m$^3$ and rock wool mats ranging in density from about 60 kg/m$^3$ to 200 kg/m$^3$, for example. Additionally, foam, cellular, or organic fibrous (either woven or unwoven) materials can form the porous mat. The porous mat can include surfaces, other than the one to which the adhesive is to be applied, to which non-porous layers (e.g., aluminum or other material foils, kraft paper, etc.) are applied. The process disclosed herein can also be used to provide adhesive on a non-porous material such as a non-rigid closed cell foam material which is compressible.

Referring to FIG. 1, the self-stick products 10 resulting from the inventive process may have a uniform or non-uniform thickness, width, or length for application in home appliances such as washing machines, dryers, dish washers, refrigerators, toaster ovens, microwaves, and standard ovens and/or range tops, for example. The self-stick products 10 can also be used in HVAC systems, automobiles, airplanes, and virtually any other application where sound damping, heat insulation, protection from environmental factors, etc. through use of a compressible material is desirable.

The self-stick products 10 can come in a variety of shapes and sizes desired by the customer, such as a manufacturer of HVAC and other OEM equipment, including mixing a variety of shapes and sizes on a single package of self-stick products as desired by the customer.

The adhesive 12 can be an elastomer-based adhesive or hot melt adhesive, or isostatic thermoplastic adhesives. However, nearly any viscous adhesive having a large solids content can be used. For instance, pressure sensitive hot melt adhesives, solvented or waterborne adhesives can be used, though the solvented adhesives are not as environmentally friendly and the waterborne adhesives can be sensitive to humidity. The adhesives can include flame retardants, antioxidants, or other additives. Adhesives such as those discussed in U.S. Pat. No. 5,106,447 can be used, for instance.

Peel-and-Stick Products

Figure 1A:
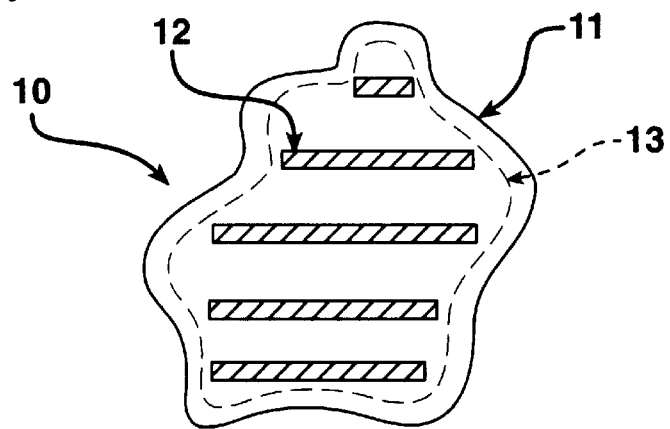
FIG. 1A shows an example of an irregularly shaped self-stick product in accordance with the present invention.
Figure 1B:
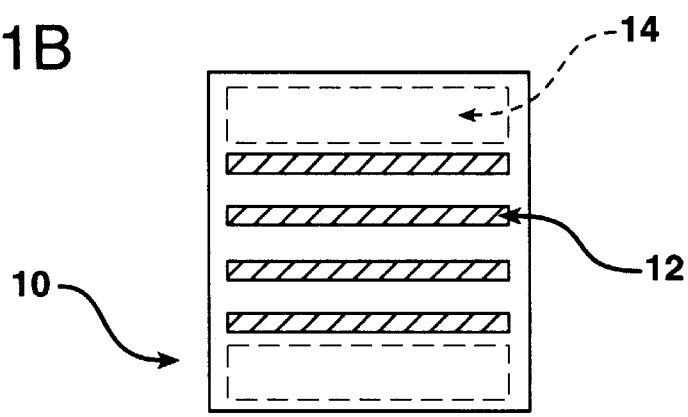
FIG. 1B shows an example of a self-stick product having flange zones where no adhesive is applied in accordance with the present invention.

The inventive self-stick product 10 can take on an irregular shape such as illustrated in FIG. 1A, or a polygonal shape such as illustrated in FIG. 1B. The adhesive strips 12 can be selectively formed within an adhesive border zone 13, which is interior to a product border 11 such that the edge of the self-stick panel product 10 does not include exposed adhesive edges.

As illustrated in FIG. 1B, non-adhesive zones 14, which form flanges where an adhesive is not desired, can be formed by the selective application of the adhesive strips 12 at other locations. These non-adhesive zones 14 are in addition to the adhesive-free zone at the edge of the self-stick product 10.

Figure 2:
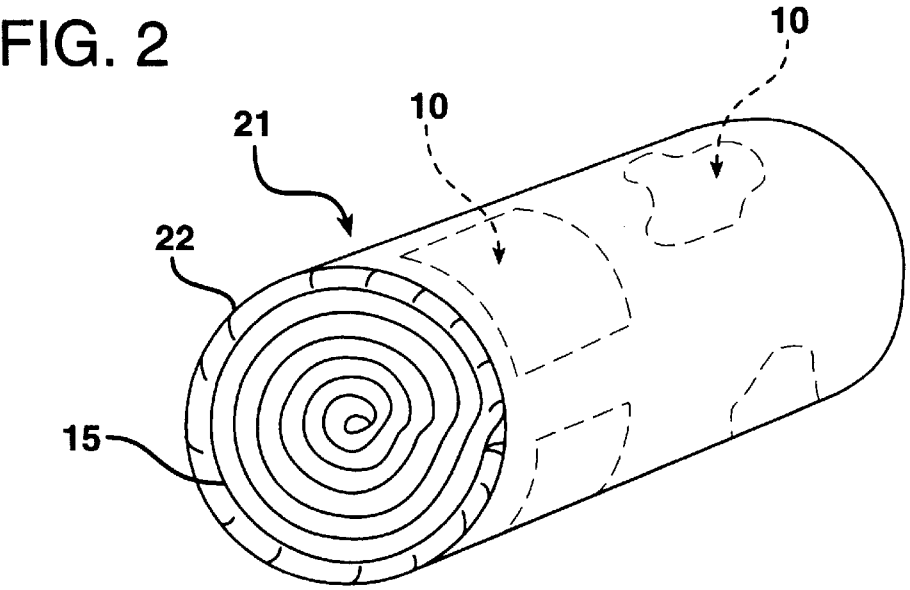
FIG. 2 illustrates a self-stick panel product on a common carrier in packaged form in accordance with the present invention.

As can be seen in FIG. 2, multiple finished products 10 can be captivated within layers of a common carrier 15. The common carrier 15 can be a form of release liner substrate material such as silicon paper, kraft paper, polyethylene-coated paper or film, or the like, which is either virgin or recycled. The multiple finished products 10 may be sequentially arranged in a row along the long dimension of the common carrier 15, or sequentially arranged and arranged side by side in a matrix format, including mixing the shapes of the self-stick products 10 in order to accommodate the manufacturing steps used by the customer in fabricating an appliance or the like. The packaged product 21 may be encased in a polyethylene bag or stretch-wrap package 22 to protect the self-stick products 10 during shipping.

Process Line

Figure 3:
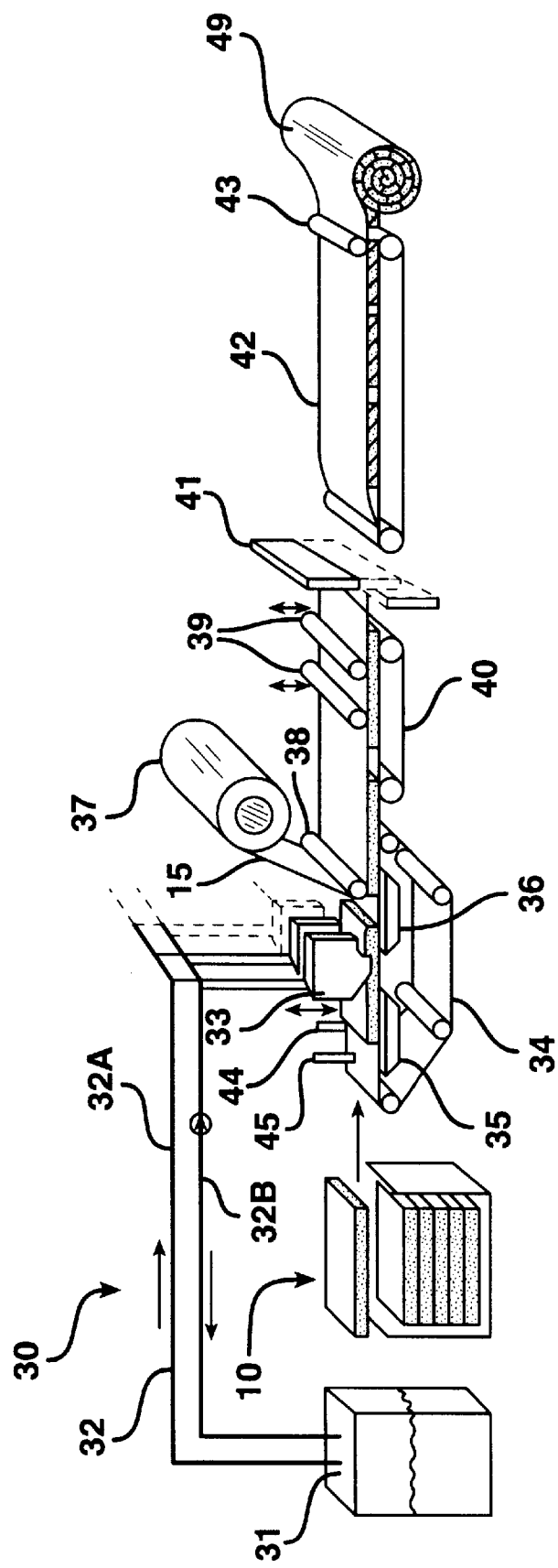
FIG. 3 illustrates a process line for producing self-stick panel products on a common carrier using a compressing adhesive applicator head in accordance with the present invention.

The package 21 of self-stick products can be produced by a unique process line 30 illustrated in FIG. 3. The process line 30 includes at least one adhesive applicator head 33 which selectively applies adhesive to the preshaped porous mats 10. In practical application, there would be a number of adhesive applicator heads 33 located side-by-side in spaced relationship for approximately the width of the common carrier 15, as illustrated in FIG. 3. Each of the adhesive applicator heads 33 is separately activated and can be separately displaced toward and away from the entry conveyor 34 to accommodate the different thicknesses of the porous mats 10, as further explained below.

Specifically, the process line 30 applies adhesive 12 to porous mats 10 in the form of ribbons or strips of adhesive 12 which are forced under controlled pressure and temperature into the mat material. The adhesive 12 penetrates the pores of the porous material and becomes an integral part of the self-stick product 10. The use of pressure by mat compression, rather than creating a vacuum, allows the mat 10 to include an integral non-porous facing material as well as permitting the production of preshaped fibrous, e.g., insulation, products while providing adhesive bond characteristics similar to that of the vacuum system.

As illustrated in FIG. 3, porous mats 10, precut or shaped to their finished dimensions, are placed on a product entry conveyor 34. The product entry conveyor 34 includes product vacuum hold-down hoods 35 and 36 for holding the mats 10 at a fixed location on the conveyor. Alternatively or additionally, pinch or nip rollers can be employed to move the mats 10 along the entry conveyor 34. Vacuum hold-down hoods permit the mats 10 to be fixed to the entry conveyor 34 closer to adhesive applicator heads 33.

The product entry conveyor 34 conveys the preshaped porous mats 10 past adhesive applicator heads 33. There may be only a few or many adhesive applicator heads 33 across the width of the entry conveyor 34, as needs suggest. The adhesive applicator heads 33 compress portions of the preshaped porous mats 10 and selectively apply a ribbon or strip of adhesive 12 onto the preshaped porous mats 10 while they are compressed. Thereafter, the portions of the porous mats 10 that have been compressed and where the adhesive 12 has been applied substantially return to their original size and shape, thus effectively drawing adhesive that contacts interior surfaces of the mat 10 in its compressed state into the interior of the mats 10 when it returns to its original thickness.

As the porous mat 10 exits the adhesive applicator heads 33, a secondary holddown vacuum 36 maintains the product position on the exit conveyor 40 until the product is free of compression and travels to the common carrier/porous material contact roller 38.

The entry conveyor 34 transports the adhesive bearing porous mats 10 to a common carrier applicator which includes a roll 37 of the common carrier or release liner material which unrolls the common carrier 15 to a common carrier/mat contact roller 38 such that a plurality of preshaped porous mats 10 are adhered to a single common carrier 15 to provide a package 21 of preshaped self-stick panel products on a common carrier.

Additionally, multiple pressure rollers 39 can be used to assure sufficient adhesive bond between the common carrier 15 and the plurality of preshaped porous mats 10, as well as to act as nip rollers driving the mat/common carrier combination along a exit conveyor 40. The distance of these pressure rollers 39 from the conveyor is adjusted to accommodate the thickness of the mats 10, as further explained below.

The common carrier 15 bearing plural preshaped self-stick panel products 10 is then cut to length by a cut-off machine 41, conveyed by a cut-off machine exit conveyor 42 with another nip roller 43 such that the common carrier 15 bearing the plural preshaped self-stick panel products 10 is rolled up on a roll-up machine 49 as a package 21.

The adhesive applicator heads 33 receive liquified adhesive from an adhesive bulk storage 31 and an adhesive delivery system 32 for delivering adhesive from the bulk storage to the adhesive applicator heads 33. The adhesive bulk storage 31 can include an adhesive bulk melter, and the delivery system 32 and adhesive applicator heads 33 can include heaters to maintain the adhesive in a liquid state during its transport when the adhesive is a hot melt adhesive.

The adhesive delivery system 32 includes an adhesive delivery path 32A and a separate adhesive return path 32B such that the adhesive is continuously circulated, whether the applicator heads 33 are dispensing adhesive or not. This leads to several advantages. First, the adhesive delivery system 32 likely would have hot spots that would char the adhesive, or cold spots that would cause the adhesive to form a plug, if it were not continuously circulated. Further, by maintaining the delivery and return paths 32A and 32B at substantially the same pressure, the activation or deactivation of one or more applicator heads 33 will not cause a pressure drop or pressure surge in other applicator heads 33.

Figure 4A:
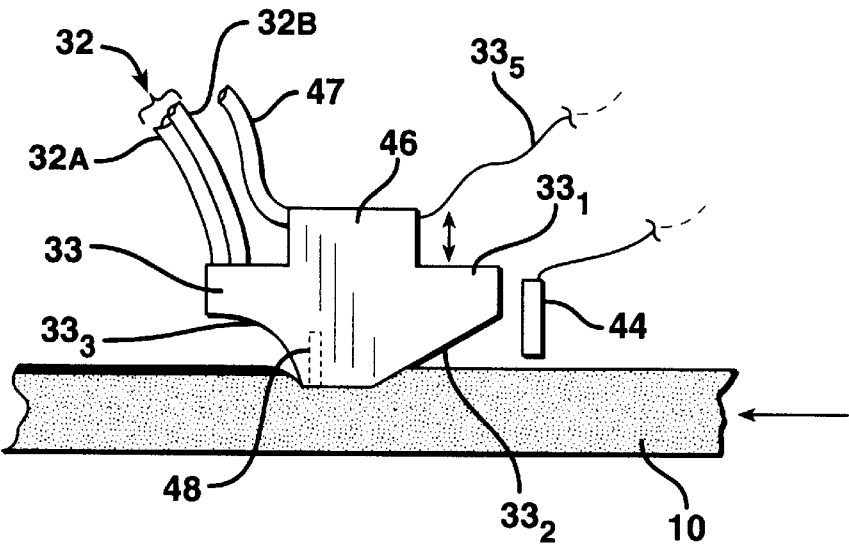
FIG. 4A illustrates a specific embodiment of an adhesive applicator head usable in connection with the process line shown in FIG. 3 in accordance with the present invention.

As illustrated in FIG. 4A, the unique adhesive applicator heads 33 of the present invention each include an adhesive supply line 32A, a return line 32B for receiving adhesive, and a supply of pneumatic pressure 47 to control a pressure relief valve 46. The adhesive applicator heads 33 compress portions of the preshaped porous mats 10 as they pass and include a manifold $33_1$ with a leading edge $33_2$ having a surface forming an acute angle with the porous mats 10 as the porous mats pass thereunder. A trailing edge $33_3$ of each of the applicator heads 33 has a concave surface facing the porous mats, as illustrated in FIG. 4A. An adhesive dispensing port 48 is located between the leading edge $33_2$ and the trailing edge $33_3$ for dispensing adhesive into the passing compressed porous mats.

Figure 4B:
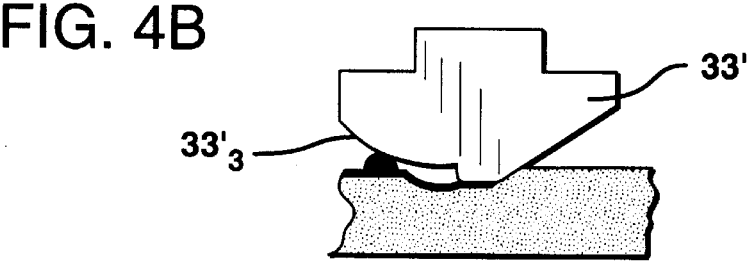
FIG. 4B illustrates a conventional, commercially available adhesive applicator head.

The shape of the applicator heads 33 is important for compression of the fiberglass so as not to produce damage, as well as to quickly and efficiently allow the adhesive to leave the applicator heads 33 without re-contacting surfaces of the applicator heads 33 as the porous material 10 recovers to its original non-compressed thickness. FIG. 4B shows a conventional adhesive applicator head 33' the trailing edge $33'_3$ of which, if used in the unique process line 30 of the present invention, would interfere with the application and become covered with adhesive.

Figure 8:
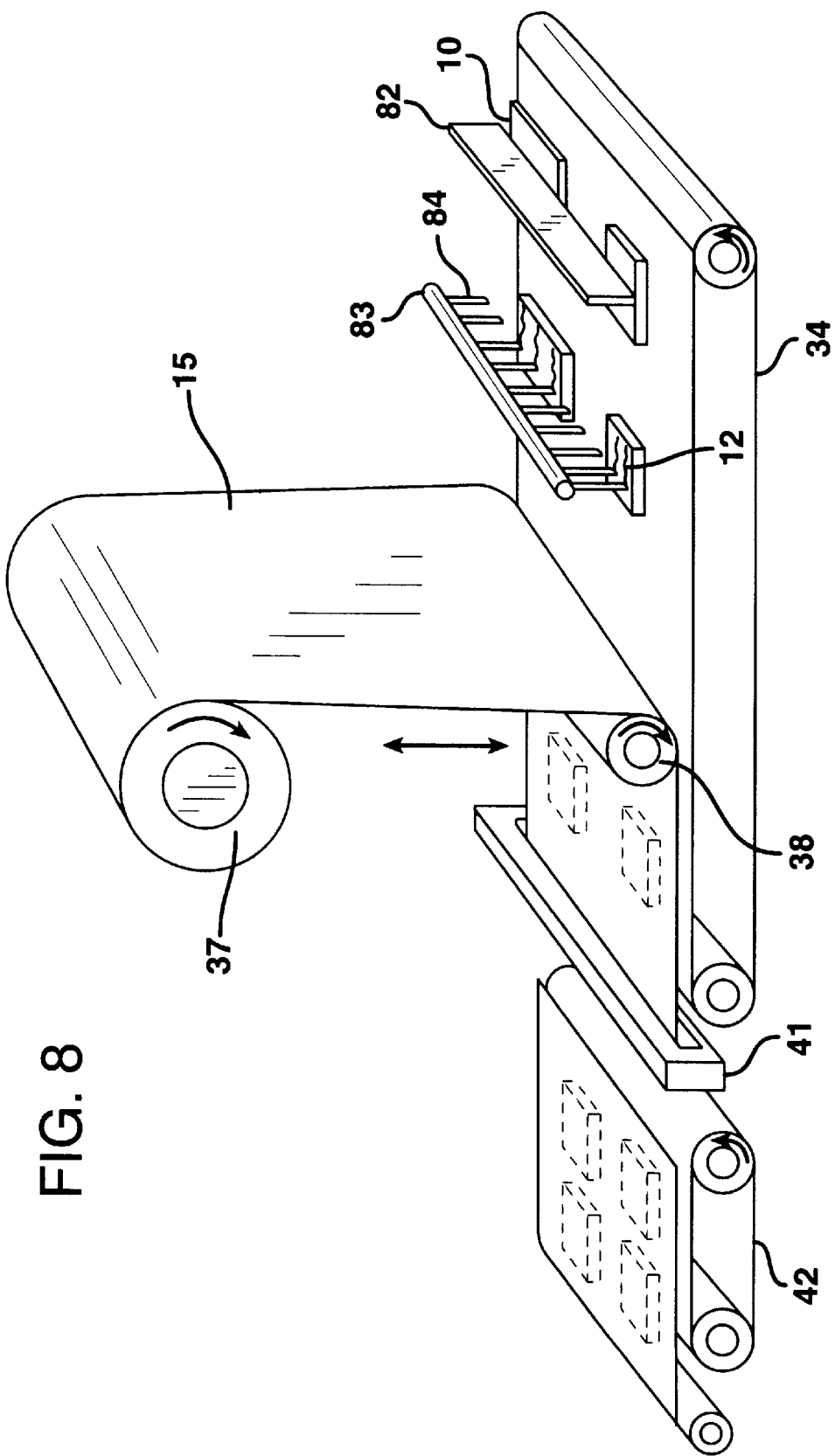
FIG. 8 illustrates a second embodiment of a process line for providing self-stick panel products on a common carrier using hot air nozzles and a glue header in accordance with the present invention.

In an alternative embodiment, the adhesive applicator heads 33 are replaced by a combination of an adhesive dispenser head 82 and hot air manifold 83 with nozzles 84 as illustrated in FIG. 8. The adhesive dispenser head 82 dispenses ribbons of adhesive 12 onto the preshaped porous mats 10. Thereafter, the hot air nozzles 83 then blow the adhesive into the porous mats 10.

The application of the adhesive 12 is selectively controlled, whether in the adhesive applicator heads 33 of FIG. 3 or in adhesive dispenser head 82 of FIG. 8, by the use of product position sensors 44 and product thickness sensors 45, illustrated in FIG. 3 (although the embodiment illustrated in FIG. 8 would largely be the same), and a microprocessor control or program logic controller represented by an electric valve control line $33_5$.

The compression of the fiberglass material is kept constant by the product thickness sensor 45 which adjusts the adhesive applicator head 33 to a correct position. The porous mats 10 are compressed by a predetermined amount, usually more than 1/16th of an inch, but less than 1/2th of an inch, and preferably 1/8th of an inch. The product thickness sensor 45 assures constant uniform compression of the porous mat 10 during adhesive application.

This compression of the mat 10 combined with the heat of the applicator heads 33 forces the adhesive into the porous material, thereby producing a good bond.

Each adhesive applicator head 33 or adhesive port in the adhesive dispenser head 82 is associated with a product position sensor 44. The product position sensors 44 detects the edges of and holes and bevels in the mats 10 in any suitable manner, such a photosensor which detects a change in light intensity or color due to the presence or absence of a mat 10, or even a finger sensor to physically touch the mat 10. The mat detection signal then activates a counter (not shown) connected to an encoder (not shown) attached to the entry conveyor 34 to count a number of pulses for the duration that adhesive is to be applied within a predetermined zone of the mat 10.

Each of the product thickness sensors 45 can be associated with an adhesive applicator head 33 to control the vertical displacement of the applicator head 33 relative to the top surface of the mat 10 to assure proper compression. The product thickness sensor 45 may be omitted in the embodiment illustrated in FIG. 8, but alternatively may be used to control the force at which the hot air exits the nozzles 83.

Because of the position sensors 44 and thickness sensors 45, the unique process line 30 of the present invention can be used to provide plural self-stick products 10 of unique shapes on a single common carrier 15.

Dispenser Machines

Figure 5:
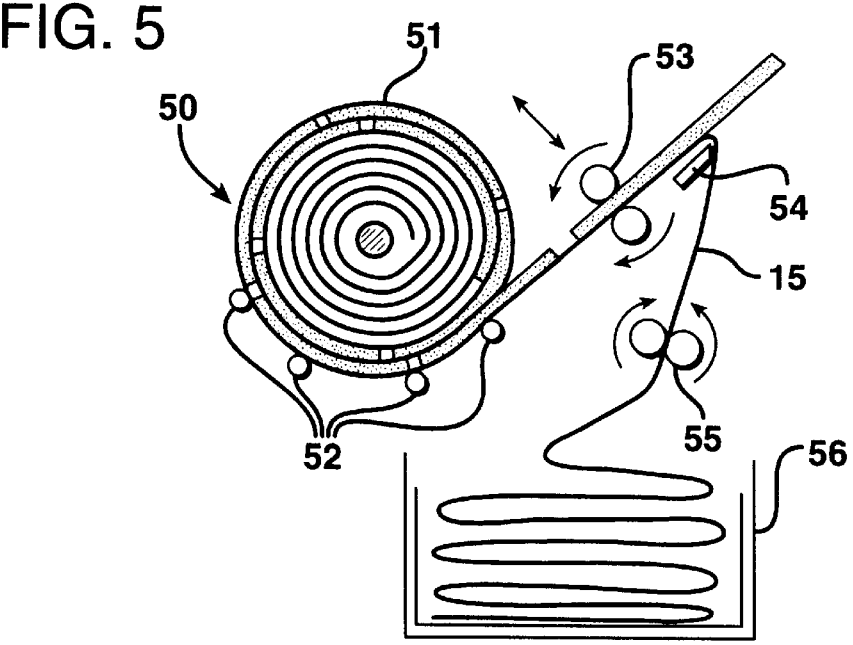
FIG. 5 illustrates one embodiment of a dispenser for dispensing the self-stick panel products from the common carrier in accordance with the present invention.

The system for providing the preshaped self-stick panel products includes a dispenser machine 50, 60. One example is illustrated in FIG. 5 wherein the dispenser machine 50 includes cradle rollers 52 for supporting a roll 51 of products 10. As the common carrier 15 is drawn from the roll 51 of products the self-stick panel products unwind from the roll 51 through pinch rollers 53. A separating bar 54 is used to pull the common carrier 15 away from the self-stick panel products 10 for either automatic or manual placement on the substrate to which the self-stick panel product is to be adhered, such as the metal panels of an HVAC system. A pinch roller mechanism 55 is used to draw the common carrier 15 into a release liner or common carrier container 56.

The self-stick product 10 on the common carrier 15 is indexed by a machine operator so that it is contained within the pinch rollers 53. These rollers 53 provide a back-tension on the common carrier 15 so that the common carrier 15 can be held tightly against the separating bar 54. The common carrier is threaded by hand into the pinch rollers or mechanism 55, which are driven such that the common carrier 15 is pulled across a separating bar 54 and is deposited to the common carrier container 56 of the machine or is rewound on a mandrel or reel 64 (see FIG. 6) for possible recycling.

Figure 6:
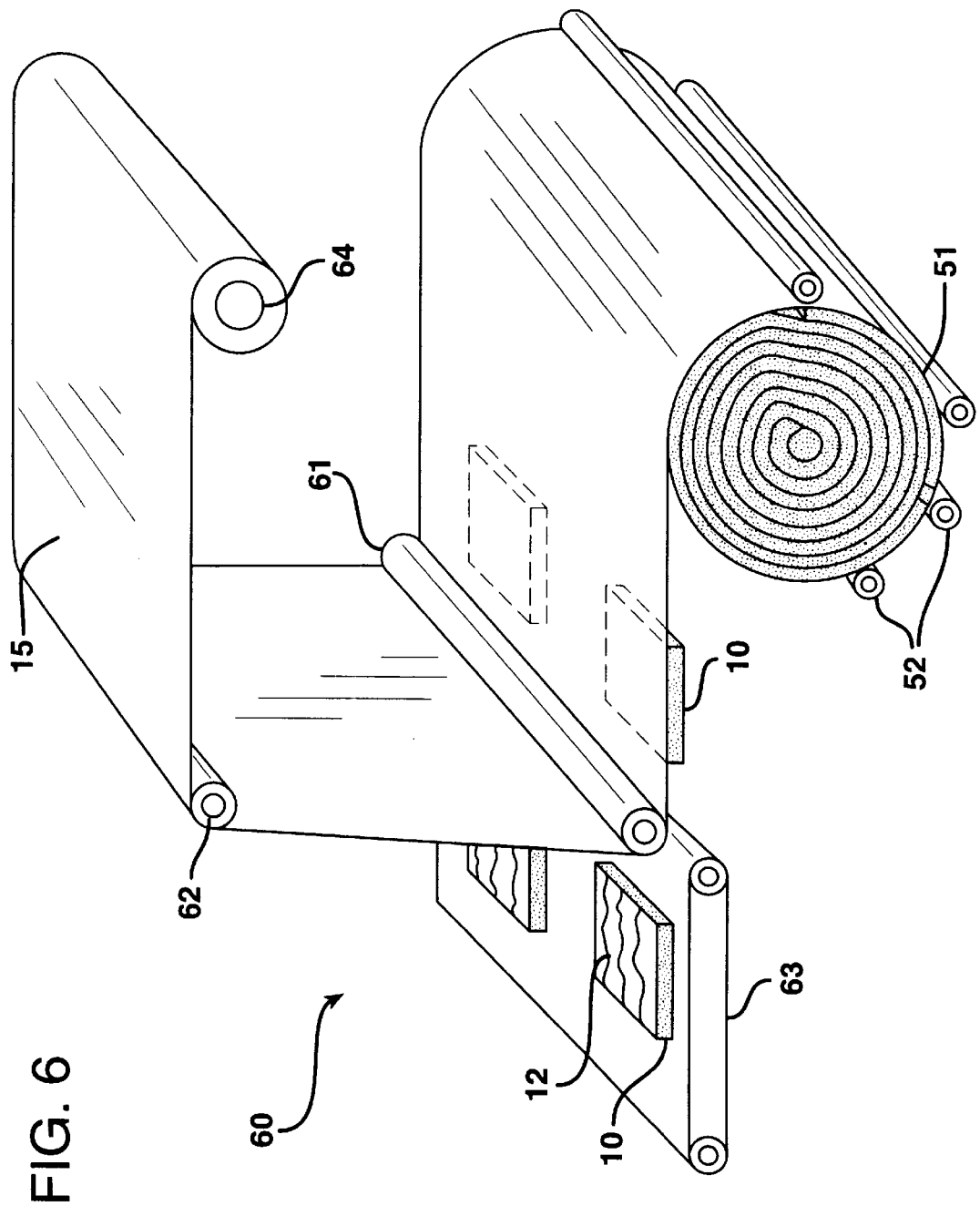
FIG. 6 illustrates yet another embodiment of a dispenser for separating self-stick panel products from a common carrier in accordance with the present invention.

As an alternative to this mechanism, FIG. 6 illustrates yet another dispensing mechanism 60 wherein the roll 51 of self-stick panel products on a common carrier is placed into cradle rollers 52, as done in the embodiment illustrated in FIG. 5. However, rather than a separating bar 54, a small diameter stripper roller 61 is used to separate the common carrier 15 from the self-stick panel products 10. The common carrier 15 then passes over another roller 62 and onto the reel 64. The reel 64, once a sufficient amount of common carrier 15 placed is placed thereon, is then sent back to the manufacturer for recycling. An outfeed conveyor 63 then conveys the self-stick panel products 10 to a position where they can be utilized for their end purpose.

Figure 9:
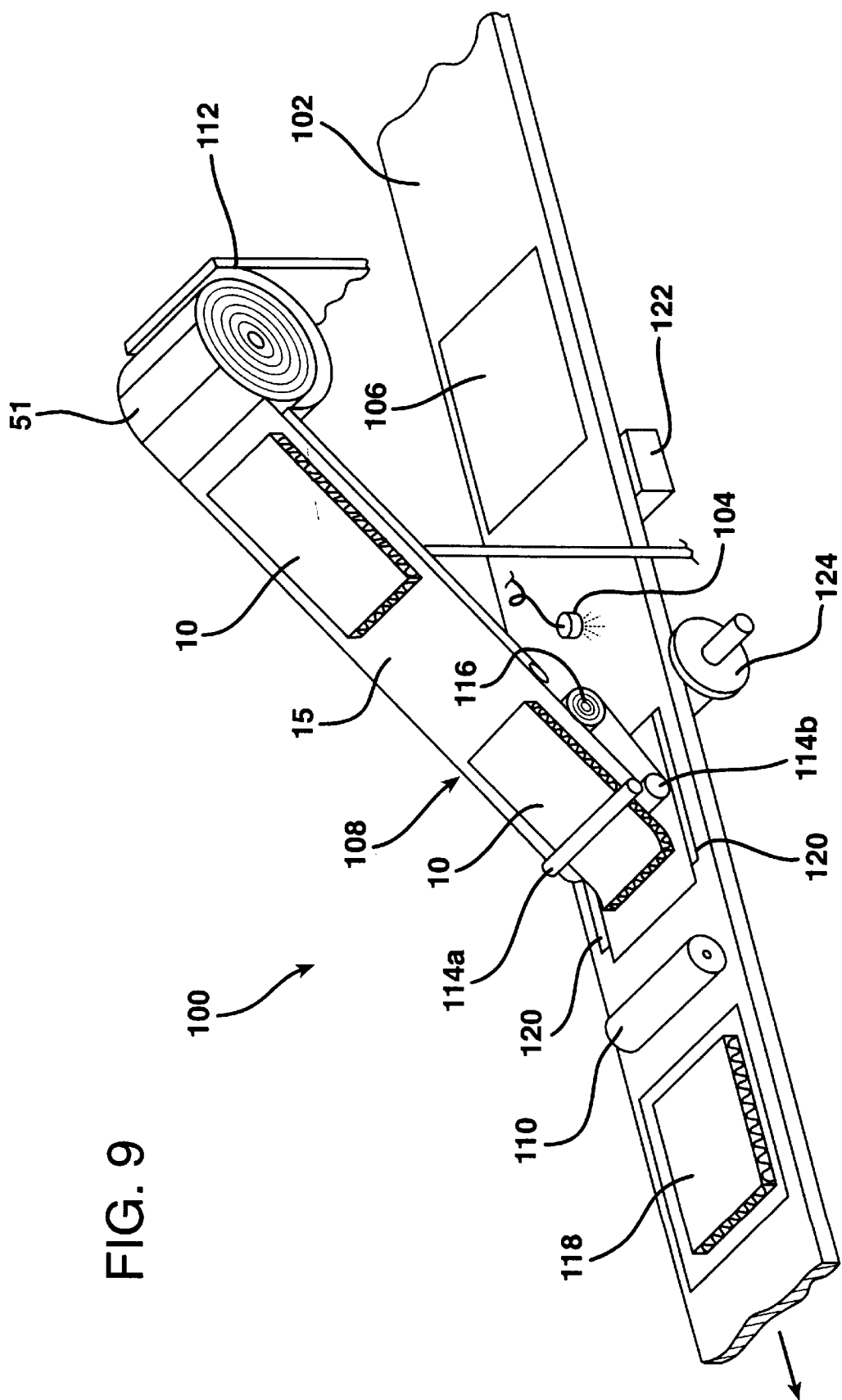
FIG. 9 illustrates a dispenser for dispensing the self-stick panel products from the common carrier to an end use substrate in accordance with the present invention.

The present invention further contemplates a system to remove the self-stick panel products from the common carrier and position the panel products on a selected substrate. As shown in FIG. 9, apparatus 100 includes a substrate line conveyor 102, a product dispenser 108, a sensor mechanism 104 for monitoring the position of each advancing substrate 106 and for indexing the panel product 10 onto the substrate 106, and a pressure roller 110 for pressing the self-stick product 10 to the substrate 106. The substrate 106 may be manufactured from metal, plastic, or any other type of material suitable for the end product requiring the application of insulation. A guide rail or strip 120 is may also be disposed on each side of the conveyor line 102 in order to keep the substrate 106 properly aligned beneath the dispenser 108.

The sensor mechanism 104 preferably cooperates with an encoder 124 and a PLC 122 which control the line speed of the conveyor 102 and the indexing of the panel product 10, the latter preferably through control of a drive mechanism (not shown) for driving, e.g., the rollers 114a, 114b, or 116, described below. The sensor mechanism 104 may be an electronic or photo-electric eye, a conventional trip wire, an electromagnetic sensor, or any other type of sensing mechanism capable of determining the relative position of the substrate. Naturally, the substrate can be of any shape desired by the customer for any particular installation.

The product dispenser 108 further includes a cradle or support mechanism 112 for supporting a roll 51 of self-stick panel products 10 on a common carrier 15. As the common carrier 15 is drawn from the roll 51, the self-stick panel products 10 unwind from the roll 51 through upper and lower pinch rollers 114a, 114b. The upper pinch roller 114a also assists in releasing the panel product 10 from the common carrier 15 so that it may be placed onto the substrate 106. The pressure applied by pinch rollers 114a, 114b may be adjusted dependent on the particular product 10 to be dispensed. A further roller mechanism 116 preferably rewinds the common carrier 15 on a mandrel or reel so that it may be easily removed for recycling. If the roller 116 also acts as the drive roller, it may be necessary to construct it as a floating roller, to accommodate its changing outside diameter during operation. Although the removal of panel products 10 has been particularly described with reference to a preferred embodiment of the apparatus 100, it should be apparent to one skilled in the art that the dispensers 50 and 60 described above, as well as variations thereof, may also be easily adapted for use in the apparatus 100.

After the self-stick panel product 10 is placed on the substrate 106 by the dispenser 108, the substrate 106 and the self-stick product 10 are conveyed beneath the pressure roller 110. The pressure roller 110 applies a predetermined pressure to the selfstick panel product 10 so that it fully bonds with the substrate 106. Thereafter, the completely assembled part 118 continues down the conveyor line 102.

By enabling the apparatus 100 to be directly installed with a customer's conveyor line, manual manipulation of the self-stick products 10 is completely eliminated. Thus, the present invention avoids minor skin irritations commonly caused by contact with insulation. Since the placement of the product 10 on the substrate is controlled by the sensor mechanism, rather than relying on repetitive motions of a worker, the customer obtains a more uniform finished part. Also, since the pressure roller applies a predetermined pressure to each of the self-stick products, sufficient pressure is uniformly applied to allow the pressure sensitive adhesive on the self-stick product to perform to maximum performance.

Refurbisher

Figure 7:
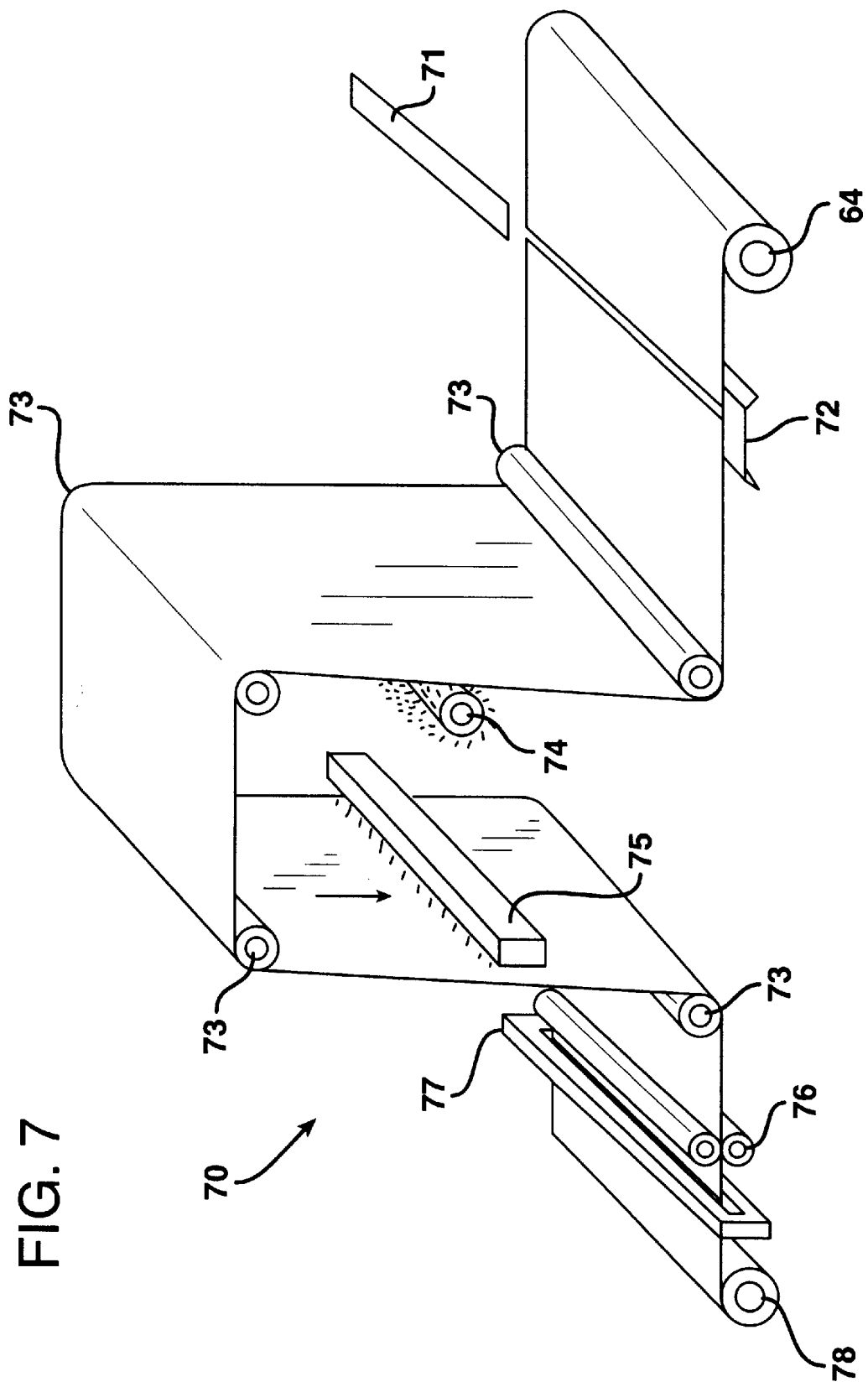
FIG. 7 illustrates the carrier refurbishing process for refurbishing the common carrier separated from the self-stick panel products in accordance with the present invention.

Whether the embodiment of FIG. 5 or the embodiment of FIG. 6 is used as a dispenser, the common carrier 15 which has been released from the packaged product 21 can be returned to a fabrication center and placed into a common carrier refurbisher 70, as shown in FIG. 7. The reel 64 or the common carrier container 56 is placed at one end of the refurbisher 70. The splice table 72 is used to juxtapose two terminal ends of common carrier 15 to be recycled. A splice tape 71 is then used to splice together the two terminal ends of the common carrier 15. The spliced together common carrier 15 then passes several rollers 73 such that the common carrier 15 passes through a wash mechanism including a wash brush roller 74 and a dryer head 75. Typically, only one side of the common carrier 15 needs to be washed, though additional wash brush rollers 74 may be added if both sides are to be washed. Similarly, the dryer head 75 can be placed on both sides of the common carrier 15.

The refurbished common carrier 15 is then output along an output conveyor which includes a vacuum hood (not illustrated) or pinch rollers 76 which effectively draws the common carrier through the refurbisher 70. Thereafter, a cutoff machine or chopper 77 cuts the spliced common carrier into predetermined lengths which are placed on a rewinder master 78. This rewinder master 78 may then be used as the roll 37 of common carrier illustrated in FIGS. 3 and 8.

By the unique system described above, a production process for producing a self-stick panel product on a common carrier applies pressure sensitive hot melt adhesive or the like in extruded ribbon form to fiberglass insulation or other porous mat 10. The process provides excellent adhesion to the surface of the porous mat 10 while allowing this process to be used for products which have an integral facing material bonded to the opposite side of the porous mat 10. This unique process is accomplished without the use of vacuums, or elevated and ramped conveyors.

As part of this invention, the unique process allows finished cut porous material parts of various uniform and non-uniform shapes (including products with holes, voids, and non-adhesive applied flange zones) to be coated with adhesive at production speeds and facilitates the packaging of these individual products 10 in a common roll 51 for utilizing a common carrier material 15.

These self-stick products 10 can then be unpackaged by the customer such that the individual self-stick products 10 can be manually, semi-automatically or automatically dispensed from the dispenser machine 50 or 60. The individual products 10 are separated from the protective release liner substrate or common carrier 15 such that the common carrier 15 is collected within the device, thereby facilitating possible recycling of the common carrier 15. The self-stick products 10 of finished shape are then presented to the person or machine in such a manner that the products are easily grasped, held and removed from the device without the difficulty of attempting to manually separate the release liner substrate from the adhesive material.

Preferred embodiments of the present invention have been described in detail. However, various modifications and improvements thereon will be readily apparent to those skilled in the art. Accordingly, the spirit and scope of the invention are to be limited only by the appended claims and not by the foregoing specification.

I claim:

1. A system for applying preshaped self-stick products to a selected substrate, said system comprising:
    a roll of preshaped self-stick products on a common carrier, the preshaped self-stick products being porous, fibrous products;
    means for selectively removing said preshaped self-stick products from said common carrier;
    means for advancing a plurality of selected substrates; and
    means for indexing each of said preshaped self-stick products onto one of said selected substrates advanced by said advancing means.

2. The system according to claim 1, further comprising means for applying pressure to said self-stick product on said selected substrate.

3. The system according to claim 2, wherein said means for applying pressure includes a pressure roller.

4. The system according to claim 1, wherein said indexing means includes sensor means for detecting the position of said selected substrate, and means for generating a signal to said advancing means and said indexing means in response to said detection by said sensor means.

5. The system according to claim 4, wherein said sensor means includes an electronic eye and said indexing means include an encoder and a PLC.

6. The system according to claim 3, wherein said removing means includes a pair of pinch rollers.

7. The system according to claim 1, wherein said removing means further comprises a roller mechanism for rewinding the common carrier for recycling.

8. The system according to claim 1, wherein said advancing means includes a conveyor line having guide strips thereon for aligning said selected substrates beneath a portion of said indexing means.

9. A system for applying preshaped self-stick products to a selected substrate, said system comprising:
    a roll of preshaped self-stick products on a common carrier, the preshaped self-stick products being porous, fibrous products;
    a conveyor line for advancing a plurality of substrates;
    a dispenser including a remover for selectively removing the common carrier from the preshaped self-stick products and dispensing the preshaped self-stick products onto each of the substrates;
    a controller for controlling an advancing speed of said conveyor line and for indexing the dispensing of the preshaped self-stick products onto each of the substrates; and
    a pressure roller for applying pressure to the self-stick product, thereby bonding the self-stick product to the substrate.

10. The system according to claim 9, wherein said conveyor line further includes guide strips for maintaining the substrates in alignment with said dispenser.

11. The system according to claim 1, wherein the removal means are disposed upstream of a point of application of said preshaped self-stick products to one of said selected substrates.

12. The system according to claim 1, wherein the removal means includes a pair of pinch rollers.

13. The system according to claim 12, wherein the removal means are disposed upstream of a point of application of said preshaped self-stick products to one of said selected substrates.

14. The system according to claim 1, wherein the advancing means is continuously operable for continuously advancing said plurality of selected substrates, the removal means is continuously operable for continuously removing successive ones of said preshaped self-stick products from said common carrier, and the removal means, the advancing means, and the indexing means are arranged to cooperate such that successive ones of said preshaped self-stick products are continuously applied to respective successive ones of said plurality of selected substrates.

15. A system for applying preshaped self-stick products to a selected substrate, said system comprising:
    a spindle for supporting roll of preshaped self-stick products on a common carrier, the preshaped self-stick products being porous, fibrous products;
    a pair of pinch rollers for selectively removing said preshaped self-stick products from said common carrier;
    a conveyor for advancing a plurality of selected substrates;
    a sensor for sensing a location of at least one of said selected substrates; and
    a controller responsive to said sensor for controlling a speed of said pinch rollers and said conveyor for controlling a location of a point of application of successive ones of said preshaped self-stick products onto successive ones of said selected substrates.

16. The system according to claim 15, further comprising a pressure roller for applying pressure to said self-stick product on said selected substrate.

17. The system according to claim 15, wherein said sensor includes an electronic eye and said controller includes an encoder and a PLC.

18. The system according to claim 15, further comprises a roller for rewinding the common carrier for recycling.

19. The system according to claim 15, wherein the pinch rollers are disposed upstream of the point of application.

* * * * *